Patented Aug. 5, 1952

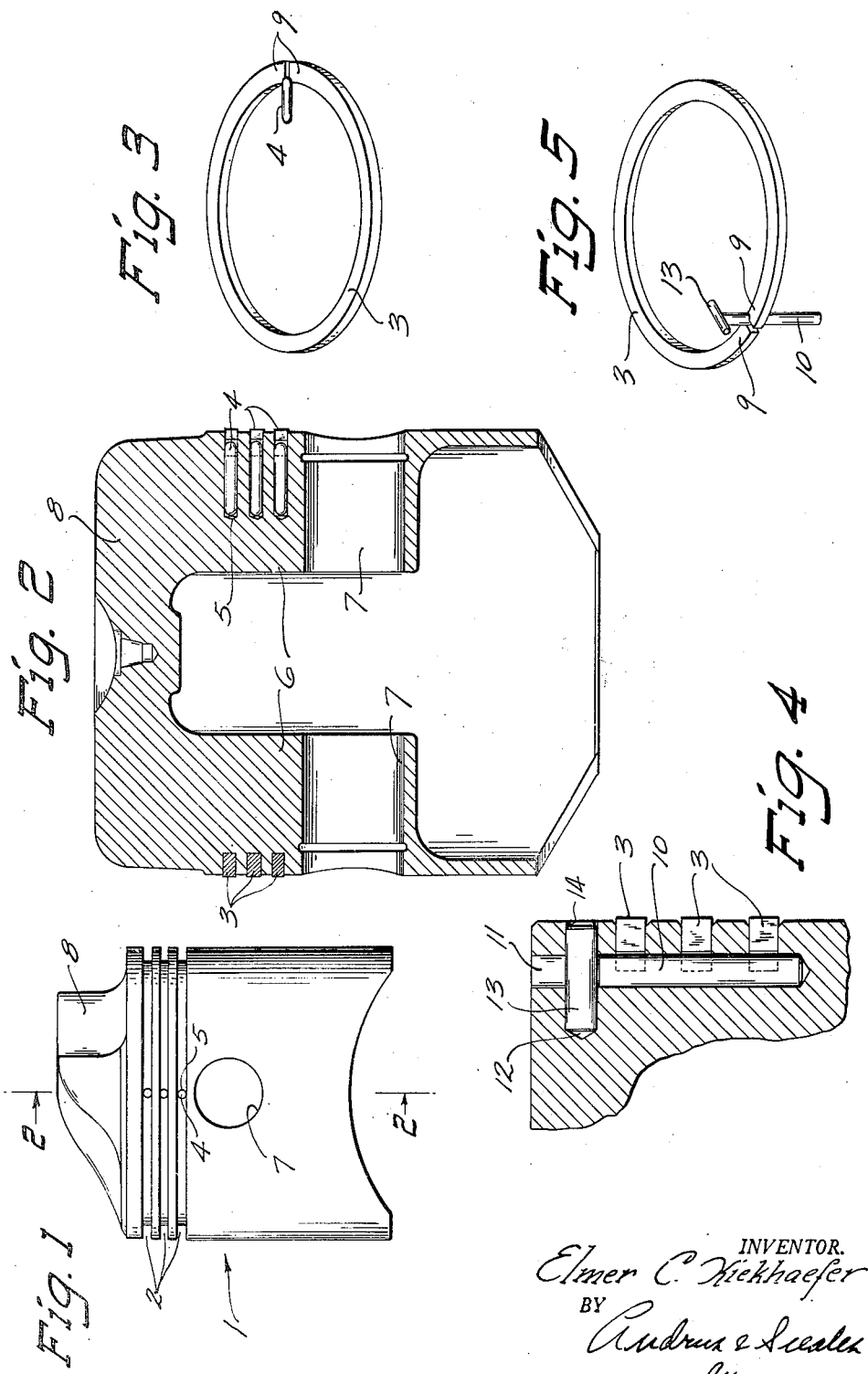

2,606,085

UNITED STATES PATENT OFFICE 2,606,085

PISTON RING LOCK

Elmer C. Kiekhaefer, Cedarburg, Wis.

Application October 7, 1948, Serial No. 53,202

16 Claims. (Cl. 309—44)

This invention relates to piston ring locks for gas engines of relatively large bore and of high speed high output type.

In air cooled two-cycle engines employing side ports in the cylinder walls it is necessary to secure the piston rings against rotation and thereby prevent the ends of the rings from registering with a port and causing undue port wear or ring breakage. Rings that are secured against rotation break in quicker and perform better and more consistently over a longer period of time with an increased horsepower output. They reduce maintenance troubles and in case an engine is torn down for repair the rings can be replaced in the same relative position to the cylinder walls restoring the engine to full load output without requiring reseating of the rings.

The rings have been secured against rotation by a pin extending across the ring glands in a direction parallel to the axis of the circular piston and registering with a slot cutting across the inner surface of each ring. This method, however, gives rise to certain difficulties in high power high speed engines and where the pin is constructed of a corrosion-resistant and wear-resistant alloy steel and the like, since the thermal expansion of the piston loosens the pin in its hole and enables it to hammer its way out of the piston thereby damaging the engine.

The principal object of the present invention is to provide a piston ring lock in which the pin is secured in place against hammering its way out of the piston.

Another object is to provide a piston ring lock of the pin type in which any desired alloy may be employed for either the pin or the piston regardless of the relative thermal expansion involved.

Another object is to increase the wear of the pin and provide a longer life for the same.

Other objects and advantages will be set forth in the following description of an embodiment of the invention illustrated in the accompanying drawings.

In the drawings:

Figure 1 is a side elevation of a piston showing the locking cross pins in end elevation;

Fig. 2 is an enlarged transverse central section through the piston taken on line 2—2 of Fig. 1;

Fig. 3 is a perspective view of a piston ring showing the relative location of a locking cross pin;

Fig. 4 is an enlarged transverse central section similar to Fig. 2 of a part of a piston and showing a modified application of the cross pin; and Fig. 5 is a view similar to Fig. 3 showing the relative location of the pin and piston ring shown in Fig. 4.

The piston 1 shown in the drawings has a cylindrical side wall with a plurality of circumferential grooves or glands 2 for receiving the usual piston rings 3.

The rings 3 are split to provide for their assembly upon the piston and for the desired radial pressure of the same against the outer walls of the engine cylinder.

The pins 4 which lock rings 3 are press fit in the blind holes 5 extending radially from each groove 2 into the piston. Holes 5 are preferably drilled in the web portion 6 between the bore 7 for the wrist pin, not shown, and the crown 8 of the piston so that the pin 4 may be provided of sufficient supporting length. The diameter of each hole 5 should be slightly smaller than the width of each groove 2 so that the sides of the grooves need not be cut away to accommodate the respective pins 4 for insertion.

The ends of pins 4 are rounded and the outer end of each pin projects into the respective groove 2 a distance approximately one-half the depth of the groove.

The split ends 9 of each ring 3 are recessed at their inner corners to fit loosely the rounded end of the respective pin, allowing sufficient clearance for compressing the ring.

Each locking pin 4 is of a hardened alloy steel similar to that used for high quality roller bearings and is selected to have high strength and high wear and corrosion-resistance at the temperatures involved. The pin 4 should be highly polished and is driven into the hole 5 until its inner end engages tight against the bottom of the hole.

In the embodiment of the invention shown in Figs. 4 and 5 the rings 3 are secured against rotation by the conventionally disposed pin 10. The pin 10 is disposed in hole 11 parallel to the axis of the piston and is inserted from the top of the piston. Hole 11 may be drilled to locate pin 10 circumferentially of the piston as desired with respect to the bore 7 or the crown 8 of the piston.

Hole 11 should be drilled so that its center is approximately coincident with the inner dimension of grooves 2 and so that the pin 10 when inserted will extend partly in each groove and in the recesses at the ends 9 of each ring to lock the latter against rotation.

The pin 10 is preferably of stainless steel and the length of the pin corresponds to the depth of hole 11 below the cross pin hole 12 drilled in the crown 8 of the piston. Hole 12 should intersect the hole 11 at a location above the upper gland 2, so that when pin 10 is fully inserted its outer end just registers with the hole 12.

The cross pin 13 is inserted in hole 12 and driven home therein by a press fit across the top of pin 10. The cross pin 13 is preferably of the same material as pin 10 and of a length slightly less than the depth of hole 6.

The cross pin 13 may be held in place by any suitable means. Preferably, the outer edge of hole 12 is peened inwardly to partially close the hole over the pin as at 14 and rivet the latter in place. Hole 12 may also be drilled to slant upwardly slightly with respect to the piston so that the hammering of the piston will tend to drive pin 13 into the hole.

The forces resulting from reciprocation of the piston do not tend to remove the cross pins. The hard, wear-resistant pins will last a long time and in some cases have been known to last until the clearances provided in the rings for the pins have become considerably wider from wearing.

Where the individual cross pins 4 are employed the hammering of the piston is carried by the full length of each pin. The pins cannot be displaced in any way by the hammering and should they become loose they will be retained in position by the rings, without damage.

The cross pin 13 holds in place the locking pin 10 as described without danger of the locking pin hammering its way out of its hole. This is so even though both the locking pin 10 and the cross pin 13 become loose in the respective holes due to differences in thermal expansion between the pin and the piston.

Various embodiments of the invention may be employed within the scope of the accompanying claims.

I claim:

1. In an engine piston operating in a power cylinder and having at least one piston ring extending circumferentially in a groove in the piston and engaging the walls of the cylinder, a lock for preventing circumferential displacement of said ring relative to said piston and cylinder whereby the fit of the ring to the cylinder wall is maintained, comprising a pin member fixed tightly in a blind hole in said piston and having a part thereof projecting into said groove, and a pin receiving recess in said ring disposed to engage said pin and thereby prevent rotation of said ring.

2. In an engine having a cylinder with a piston operating therein, a split piston ring disposed within a groove in the circumferential wall of the piston, and a locking pin disposed within a corresponding hole extending radially of the piston and opening into said groove, said locking pin being disposed to project into said groove and between the ends of the ring to lock the later rotationally with respect to said piston.

3. In an engine having a cylinder with a piston operating therein, a piston ring disposed within a groove in the circumferential wall of the piston, and a locking pin disposed within a corresponding hole extending radially of the piston and opening into said groove to engage said ring and to prevent the rotation thereof relative to said piston.

4. In an engine having a cylinder with a piston operating therein, a split piston ring disposed in a groove in the circumferential wall of the piston, a locking pin disposed in a hole in the piston and extending between the ends of said ring to lock the same against rotation relative to the piston, said hole for the locking pin extending in the direction of movement of the piston whereby said pin is subjected to forces tending to remove the pin from the piston during reciprocation of the latter, and a metal member bridging the hole in engagement with the end of the pin to prevent the pin from displacement in said hole.

5. In an engine having a cylinder with a piston operating therein, a split piston ring disposed in a groove in the circumferential wall of the piston, a locking pin disposed in a hole in the piston and extending between the ends of said ring to lock the same against rotation relative to the piston, said hole for the locking pin extending in the direction of movement of the piston whereby said pin is subjected to forces tending to remove the pin from the piston during reciprocation of the latter, and a cross pin bridging the hole to prevent the locking pin from displacement therefrom.

6. In combination with an engine piston, a lock for securing a piston ring against rotation relative to the piston, comprising a locking pin of hard wear-resistant metal press fitted in a hole extending from the top of the piston, said pin extending across the groove for said piston ring, and a metal member bridging the mouth of said hole and securing said locking pin in place.

7. In combination with an engine piston, a lock for securing a piston ring against rotation relative to the piston, comprising a locking pin of hard wear-resistant metal press fitted in a hole extending from the top of the piston, said pin extending across the groove for said piston ring, and a cross pin of similar metal press fitted in a transverse hole bridging the end of said locking pin to prevent its displacement from the piston in service.

8. In combination with an engine piston, a lock for securing a piston ring against rotation relative to the piston, comprising a locking pin of hard, wear-resistant metal press fitted in a hole extending from the top of the piston, said pin extending across the groove for said piston ring, a cross pin of similar metal press fitted in a transverse hole bridging the end of said locking pin to prevent its displacement from the piston in service, and means securing said cross pin in place.

9. In combination with an engine piston, a piston ring disposed in a circumferential groove in the piston, a locking pin extending axially of the piston and interlocking with said ring to limit turning of the latter relative to the piston, and a metal member extending transversely of the piston over the outer end of said locking pin to prevent its displacement from the piston in service.

10. In combination with an engine piston, a piston ring disposed in a circumferential groove in the piston, a locking pin extending axially of the piston and interlocking with said ring to limit turning of the latter relative to the piston, and a cross pin extending transversely over the outer end of said locking pin in said piston to prevent axial displacement of the locking pin in service.

11. In combination with an engine piston, a piston ring disposed in a circumferential groove in the piston, a locking pin extending axially of the piston and interlocking with said ring to limit turning of the latter relative to the piston, and a cross pin extending transversely over the outer end of said locking pin in said piston to prevent axial displacement of the locking pin in service, and means to prevent outward displacement of said cross pin.

12. In combination with an engine piston, a lock for securing a piston ring against rotation relative to the piston, comprising a locking pin of hard, wear-resistant metal press fitted in a hole extending from the top of the piston, said pin extending across the groove for said piston ring, and a cross pin disposed in a transverse hole extending from the circumferential wall of the piston at an upward slant across the top of the locking pin to prevent its displacement from the piston in service.

13. In combination with an engine piston, a lock for securing a piston ring against rotation relative to the piston, comprising a locking pin of hard, wear-resistant metal press fitted in a hole extending from the top of the piston, said pin extending across the groove for said piston ring, a cross pin disposed in a transverse hole extending from the circumferential wall of the piston at an upward slant across the top of the locking pin to prevent its accidental displacement from the piston in service, and means securing said cross pin in place.

14. In a lightweight, thin-walled, high-speed piston for internal-combustion engines and the like having at least one piston ring extending circumferentially of the piston in a groove, a wrist pin carried in bosses formed oppositely in the piston wall, web portions supporting said bosses internally of the piston and formed integrally therewith, and a pin member of substantial length press fitted in a blind hole extending from said groove into one of said web portions, said pin being disposed to project into said groove to engage said piston ring and secure the latter against rotative displacement in said groove.

15. A lightweight high-speed piston for internal-combustion engines and the like comprising a dome, a thin-walled skirt extending from said dome to engage the cylinder walls of the engine, a wrist pin adapted to receive the upper end of the engine connecting rod, web portions formed integrally with said skirt and dome and extending from the latter to support said wrist pin within said skirt, at least one piston ring extending circumferentially of the piston in a groove formed in said skirt adjacent said web portions, and a pin member of substantial length press fitted in a blind hole extending from said groove into one of said web portions, said pin being disposed to project into said groove to engage said piston ring and secure the latter against rotative displacement in said groove.

16. In a lightweight, thin-walled, high-speed piston for internal-combustion engines and the like having at least one piston ring in a groove and including adjacent portions of enlarged transverse section, abutment means in said groove disposed to engage said ring and secure the latter against rotational displacement, and a pin member of substantial length press fitted in a blind hole extending radially into said portions of enlarged transverse section and positively supporting said abutment means against displacement in at least one direction of piston movement.

ELMER C. KIEKHAEFER.

REFERENCES CITED

The following references are of record in the file of this patent:

UNITED STATES PATENTS

| Number | Name | Date |
|---|---|---|
| 48,851 | Stevens | July 18, 1865 |
| 1,198,993 | Birkigt | Sept. 19, 1916 |
| 2,192,926 | Meyers | Mar. 12, 1940 |
| 2,481,552 | Williams | Sept. 13, 1949 |
| 2,481,553 | Williams | Sept. 13, 1949 |

FOREIGN PATENTS

| Number | Country | Date |
|---|---|---|
| 166,210 | Great Britain | July 11, 1921 |
| 496,107 | Great Britain | Nov. 24, 1938 |
| 497,823 | Great Britain | Dec. 29, 1938 |